United States Patent
Sakamine et al.

(10) Patent No.: US 10,926,139 B2
(45) Date of Patent: Feb. 23, 2021

(54) GOLF BALL

(71) Applicant: SUMITOMO RUBBER INDUSTRIES, LTD., Kobe (JP)

(72) Inventors: Ryota Sakamine, Kobe (JP); Hiroshi Tadaoka, Kobe (JP); Chiemi Mikura, Kobe (JP); Kazuyoshi Shiga, Kobe (JP)

(73) Assignee: SUMITOMO RUBBER INDUSTRIES, LTD., Kobe (JP)

( * ) Notice: Subject to any disclaimer, the term of this patent is extended or adjusted under 35 U.S.C. 154(b) by 0 days.

(21) Appl. No.: 16/453,630

(22) Filed: Jun. 26, 2019

(65) Prior Publication Data

US 2020/0001137 A1  Jan. 2, 2020

(30) Foreign Application Priority Data

Jun. 27, 2018 (JP) .............................. JP2018-121541

(51) Int. Cl.

| | | |
|---|---|---|
| *A63B 37/02* | (2006.01) | |
| *C08K 5/3477* | (2006.01) | |
| *A63B 37/00* | (2006.01) | |
| *C08K 5/00* | (2006.01) | |
| *C08L 9/00* | (2006.01) | |
| *C08K 5/098* | (2006.01) | |
| *C08K 5/39* | (2006.01) | |
| *C08K 5/3492* | (2006.01) | |
| *C08K 5/47* | (2006.01) | |
| *C08K 5/44* | (2006.01) | |
| *C08K 5/3462* | (2006.01) | |

(52) U.S. Cl.
CPC ........ *A63B 37/005* (2013.01); *A63B 37/0051* (2013.01); *A63B 37/0061* (2013.01); *A63B 37/0065* (2013.01); *A63B 37/0074* (2013.01); *A63B 37/0087* (2013.01); *C08K 5/0025* (2013.01); *C08K 5/098* (2013.01); *C08K 5/3462* (2013.01); *C08K 5/3477* (2013.01); *C08K 5/34928* (2013.01); *C08K 5/39* (2013.01); *C08K 5/44* (2013.01); *C08K 5/47* (2013.01); *C08L 9/00* (2013.01)

(58) Field of Classification Search
None
See application file for complete search history.

(56) References Cited

U.S. PATENT DOCUMENTS

| | | | | |
|---|---|---|---|---|
| 2007/0142568 | A1* | 6/2007 | Kim ................... | A63B 37/007 525/375 |
| 2014/0206476 | A1* | 7/2014 | Sakamine .......... | A63B 37/0063 473/372 |
| 2018/0056137 | A1* | 3/2018 | Nagakura ............ | C08K 5/0025 |

FOREIGN PATENT DOCUMENTS

JP          2014-138658 A          7/2014

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a golf ball having excellent resilience. The present invention provides a golf ball comprising a spherical core and at least one cover covering the spherical core, wherein the spherical core is formed from a rubber composition containing (a) a base rubber, and (b) a co-crosslinking agent containing (b1) a carboxylic acid represented by a structural formula (1) and/or a metal salt thereof.

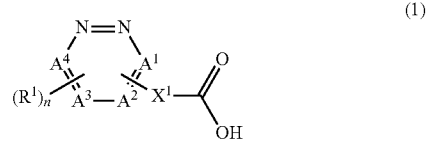

(1)

[In the formula (1), $A^1$ to $A^4$ each independently represents a nitrogen atom or a carbon atom. $X^1$ represents a single bond or a divalent organic group. $R^1$ represents a hydrogen atom or a monovalent organic group. It is noted that at least one of $A^1$ to $A^4$ is the carbon atom, and $X^1$ and $R^1$ bond to the carbon atom. n represents an integer of 0 to 3. When n is 2 or more, a plurality of $R^1$ may be identical to or different from each other, and a plurality of $R^1$ may bond to each other to form a ring structure.]

20 Claims, 1 Drawing Sheet

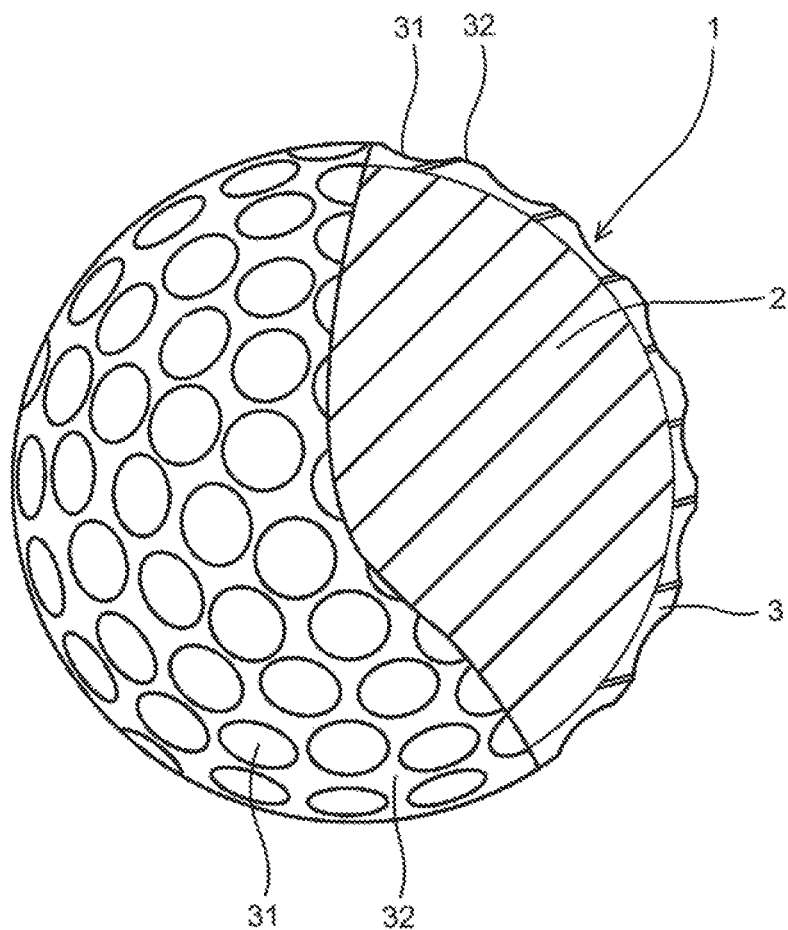

GOLF BALL

FIELD OF THE INVENTION

The present invention relates to a golf ball having excellent resilience performance, and specifically, relates to a technology for improving a core of a golf ball.

DESCRIPTION OF THE RELATED ART

Generally, a solid rubber core of a golf ball is prepared by heat-pressing a rubber composition containing a polybutadiene rubber as a base rubber, an unsaturated carboxylic acid metal salt as a co-crosslinking agent, dicumyl peroxide as a crosslinking initiator. In this composition, the unsaturated carboxylic acid metal salt is grafted to the polybutadiene backbone by the crosslinking initiator such as dicumyl peroxide, and functions as a co-crosslinking agent.

In addition, it has been proposed to add various carboxylic acids in a core rubber composition to control the hardness profile of the core. For example, JP 2014-138658 A discloses a golf ball comprising a spherical core and at least one cover covering the spherical core, wherein the spherical core is formed from a rubber composition containing (a) a base rubber, (b) an α,β-unsaturated carboxylic acid having 3 to 8 carbon atoms and/or a metal salt thereof as a co-crosslinking agent, (c) a crosslinking initiator, and (d) a carboxylic acid having a heterocycle and/or a salt thereof.

SUMMARY OF THE INVENTION

In a conventional golf ball core rubber composition, a metal salt of an unsaturated carboxylic acid is used, particularly (meth)acrylic acid is widely used, as a co-crosslinking agent of a base rubber (particularly polybutadiene rubber). In such rubber composition, the rubber is cured by heat of a reaction between the base rubber and the co-crosslinking agent, thereby exerting properties such as resilience. However, when zinc (meth)acrylate is used as the co-crosslinking agent, not only the reaction between the co-crosslinking agent and the base rubber, but also a side reaction between the co-crosslinking agents occurs. In this case, a polymer of the co-crosslinking agent that does not contribute to the crosslinking of the rubber exists in the cured rubber, and thus the material properties fail to be fully exerted. In addition, a conventional co-crosslinking agent has poor affinity to polybutadiene rubber, and thus it has poor dispersibility in the base rubber. This poor dispersibility is also a reason of deteriorating the crosslinking efficiency.

The present invention has been achieved in view of the above-mentioned problems, and an object of the present invention is to provide a golf ball having excellent resilience by using a co-crosslinking agent having good dispersibility in polybutadiene rubber and high crosslinking efficiency.

The present invention that has solved the above problems provides a golf ball comprising a spherical core and at least one cover covering the spherical core, wherein the spherical core is formed from a rubber composition containing (a) a base rubber, and (b) a co-crosslinking agent containing (b1) a carboxylic acid represented by a structural formula (1) and/or a metal salt thereof.

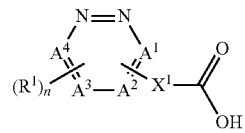

[In the formula (1), $A^1$ to $A^4$ each independently represents a nitrogen atom or a carbon atom; $X^1$ represents a single bond or a divalent organic group; $R^1$ represents a hydrogen atom or a monovalent organic group; it is noted that at least one of $A^1$ to $A^4$ is the carbon atom, and $X^1$ and $R^1$ bond to the carbon atom; n represents an integer of 0 to 3; n is 0 when one of $A^1$ to $A^4$ is the carbon atom; n is 1 when two of $A^1$ to $A^4$ are the carbon atom; n is 2 when three of $A^1$ to $A^4$ are the carbon atom; n is 3 when all of $A^1$ to $A^4$ are the carbon atom; and when n is 2 or more, a plurality of $R^1$ may be identical to or different from each other, and a plurality of $R^1$ may bond to each other to form a ring structure.]

The component (b1) has a diazine structure, triazine structure, tetrazine structure or pentazine structure in the molecule, and bonds to the base rubber via these structures. In addition, the diazine structure or the like has high affinity to the base rubber and high dispersibility in the base rubber. Thus, if the component (b1) is used as (b) the co-crosslinking agent, the obtained golf ball has excellent resilience.

According to the present invention, a golf ball having excellent resilience is obtained.

BRIEF DESCRIPTION OF THE DRAWINGS

The FIGURE is a partially cutaway sectional view showing a golf ball according to one embodiment of the present invention.

DESCRIPTION OF THE PREFERRED EMBODIMENT

The present invention provides a golf ball comprising a spherical core and at least one cover covering the spherical core, wherein the spherical core is formed from a rubber composition containing (a) a base rubber and (b) a co-crosslinking agent. (b) The co-crosslinking agent contains (b1) a carboxylic acid represented by a structural formula (1) and/or a metal salt thereof.

The component (b1) has a diazine structure, triazine structure, tetrazine structure or pentazine structure in the molecule, and can bond to the base rubber via these structures. In addition, the diazine structure or the like has high affinity to the base rubber and high dispersibility in the base rubber, thus the crosslinking efficiency improves. Thus, if the component (b1) is used as (b) the co-crosslinking agent, the obtained golf ball has excellent resilience.

(a) Base Rubber

As (a) the base rubber, a natural rubber and/or a synthetic rubber may be used. For example, a polybutadiene rubber, a natural rubber, a polyisoprene rubber, a styrene polybutadiene rubber, an ethylene-propylene-diene rubber (EPDM), or the like may be used. These rubbers may be used solely or in combination of at least two of them. As (a) the base rubber, a diene rubber is preferable. The amount of the diene rubber in (a) the base rubber is preferably 50 mass % or more, more preferably 70 mass % or more, and even more preferably 90 mass % or more. It is also preferable that (a) the base rubber consists of the diene rubber. Among the diene rubbers, particularly preferred is a high-cis polybutadiene having a cis-1,4 bond which is favorable to resilience in a proportion of 40 mass % or more, preferably 80 mass % or more, and more preferably 90 mass % or more. The amount of the high-cis polybutadiene in (a) the base rubber is preferably 50 mass % or more, more preferably 70 mass % or more.

The high-cis polybutadiene preferably has a 1,2-vinyl bond in an amount of 2.0 mass % or less, more preferably 1.7 mass % or less, and even more preferably 1.5 mass % or less. If the amount of the 1,2-vinyl bond is excessively high, the resilience may be lowered.

The high-cis polybutadiene is preferably one synthesized using a rare-earth element catalyst. When a neodymium catalyst employing a neodymium compound which is a lanthanum series rare-earth element compound, is used, a polybutadiene rubber having a high amount of the cis-1,4 bond and a low amount of the 1,2-vinyl bond is obtained with an excellent polymerization activity, and thus such polybutadiene rubber is particularly preferred.

The high-cis polybutadiene preferably has a molecular weight distribution Mw/Mn (Mw: weight average molecular weight, Mn: number average molecular weight) of 2.0 or more, more preferably 2.2 or more, even more preferably 2.4 or more, and most preferably 2.6 or more, and preferably has a molecular weight distribution Mw/Mn of 6.0 or less, more preferably 5.0 or less, even more preferably 4.0 or less, and most preferably 3.4 or less. If the molecular weight distribution (Mw/Mn) of the high-cis polybutadiene is excessively low, the processability may deteriorate, and if the molecular weight distribution (Mw/Mn) of the high-cis polybutadiene is excessively high, the resilience may be lowered. It is noted that the molecular weight distribution is measured by gel permeation chromatography ("HLC-8120GPC" available from Tosoh Corporation) using a differential refractometer as a detector under the conditions of column: GMHHXL (available from Tosoh Corporation), column temperature: 40° C., and mobile phase: tetrahydrofuran, and calculated by converting based on polystyrene standard.

The high-cis polybutadiene preferably has a Mooney viscosity ($ML_{1+4}$ (100° C.)) of 30 or more, more preferably 32 or more, and even more preferably 35 or more, and preferably has a Mooney viscosity ($ML_{1+4}$ (100° C.)) of 140 or less, more preferably 120 or less, even more preferably 100 or less, and most preferably 80 or less. It is noted that the Mooney viscosity ($ML_{1+4}$ (100° C.)) in the present invention is a value measured according to JIS K6300 using an L rotor under the conditions of preheating time: 1 minute, rotor rotation time: 4 minutes, and temperature: 100° C.

The rubber composition preferably contains at least two high-cis polybutadienes having a Mooney viscosity ($ML_{1+4}$ (100° C.)) different from each other as (a) the base rubber, more preferably two high-cis polybutadienes. In the case that two high-cis polybutadienes are contained, the first high-cis polybutadiene preferably has a Mooney viscosity ($ML_{1+4}$ (100° C.)) of less than 50, and the second high-cis polybutadiene preferably has a Mooney viscosity ($ML_{1+4}$ (100° C.)) of 50 or more.

The Mooney viscosity ($ML_{1+4}$ (100° C.)) of the first high-cis polybutadiene is preferably 30 or more, more preferably 32 or more, and even more preferably 35 or more, and is preferably less than 50, more preferably 49 or less, and even more preferably 48 or less. The Mooney viscosity ($ML_{1+4}$ (100° C.)) of the second high-cis polybutadiene is preferably 50 or more, more preferably 52 or more, and even more preferably 54 or more, and is preferably 100 or less, more preferably 90 or less, even more preferably 80 or less, and most preferably 70 or less.

The mass ratio (first high-cis polybutadiene/second high-cis polybutadiene) of the first high-cis polybutadiene to the second high-cis polybutadiene in (a) the base rubber is preferably 0.3 or more, more preferably 0.5 or more, and even more preferably 0.7 or more, and is preferably 3.0 or less, more preferably 2.0 or less, and even more preferably 1.5 or less.

The rubber composition also preferably contains polybutadiene rubber and polyisoprene rubber as (a) the base rubber. The Mooney viscosity ($ML_{1+4}$ (100° C.)) of the polyisoprene rubber is preferably 55 or more, more preferably 60 or more, and even more preferably 65 or more, and is preferably 120 or less, more preferably 110 or less, and even more preferably 100 or less.

The mass ratio (polybutadiene rubber/polyisoprene rubber) of the polybutadiene rubber to the polyisoprene rubber in (a) the base rubber is preferably 1 or more, more preferably 2 or more, and even more preferably 4 or more, and is preferably 20 or less, more preferably 15 or less, and even more preferably 10 or less.

(b) Co-Crosslinking Agent (b) The co-crosslinking agent contains (b1) the carboxylic acid represented by the structural formula (1) and/or the metal salt thereof. The component (b1) has a diazine structure, triazine structure, tetrazine structure or pentazine structure in the molecule, and bonds to the base rubber via these structures. In addition, the diazine structure or the like has high affinity to the base rubber and high dispersibility in the base rubber. Thus, if the component (b1) is used as (b) the co-crosslinking agent, the obtained golf ball has excellent resilience. The component (b1) may be used solely, or two or more of them may be used in combination.

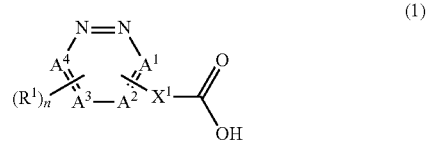

(1)

[In the formula (1), $A^1$ to $A^4$ each independently represents a nitrogen atom or a carbon atom; $X^1$ represents a single bond or a divalent organic group; $R^1$ represents a hydrogen atom or a monovalent organic group; it is noted that at least one of $A^1$ to $A^4$ is the carbon atom, and $X^1$ and $R^1$ bond to the carbon atom; n represents an integer of 0 to 3; n is 0 when one of $A^1$ to $A^4$ is the carbon atom; n is 1 when two of $A^1$ to $A^4$ are the carbon atom; n is 2 when three of $A^1$ to $A^4$ are the carbon atom; n is 3 when all of $A^1$ to $A^4$ are the carbon atom; and when n is 2 or more, a plurality of $R^1$ may be identical to or different from each other, and a plurality of $R^1$ may bond to each other to form a ring structure.]

The divalent organic group represented by $X^1$ is a divalent hydrocarbon group (may be saturated or unsaturated, linear or branched, and optionally has a cyclic structure in the structure) optionally having a hetero atom or a halogen atom. Examples of the hetero atom include nitrogen, oxygen, sulfur, and phosphorus.

The monovalent organic group represented by $R^1$ is a monovalent hydrocarbon group (may be saturated or unsaturated, linear or branched, and optionally has a cyclic structure in the structure) optionally having a hetero atom or a halogen atom. Examples of the hetero atom include nitrogen, oxygen, sulfur, and phosphorus.

Examples of the metal atom constituting (b1) the metal salt of the carboxylic acid represented by the structural formula (1) include an alkaline earth metal such as calcium, strontium and barium; a transition metal such as scandium, titanium, vanadium, chromium, manganese, iron, cobalt, nickel, copper, yttrium, zirconium, niobium, molybdenum, technetium, ruthenium, rhodium, palladium, silver, hafnium, tantalum, tungsten, rhenium, osmium, iridium, platinum and gold; and a base metal such as beryllium, magnesium, aluminum, zinc, gallium, cadmium, indium, tin, thallium, lead, bismuth and polonium. These metal atoms may be used solely, or at least two of them may be used. Among them, as the metal atom, the metal atom capable of forming a divalent metal ion is preferable, at least one metal selected from the group consisting of beryllium, magnesium, calcium, zinc and barium is more preferable.

In the case that the metal atom is capable of forming a divalent metal ion, in (b1) the metal salt of the carboxylic acid represented by the structural formula (1), as represented by the following formula (1-1), all the carboxylic acid components may be the carboxylic acid represented by the structural formula (1), or alternatively as represented the following formula (1-2), one carboxylic acid component is the carboxylic acid represented by the structural formula (1) and the other carboxylic acid component is a carboxylic acid different from the carboxylic acid represented by the structural formula (1).

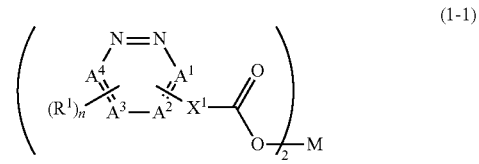

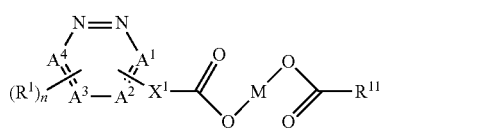

[In the formulae (1-1), (1-2), $A^1$ to $A^4$ each independently represents a nitrogen atom or a carbon atom; $X^1$ represents a single bond or a divalent organic group; $R^1$ represents a hydrogen atom or a monovalent organic group; it is noted that at least one of $A^1$ to $A^4$ is the carbon atom, and $X^1$ and $R^1$ bond to the carbon atom; n represents an integer of 0 to 3; n is 0 when one of $A^1$ to $A^4$ is the carbon atom; n is 1 when two of $A^1$ to $A^4$ are the carbon atom; n is 2 when three of $A^1$ to $A^4$ are the carbon atom; n is 3 when all of $A^1$ to $A^4$ are the carbon atom; when n is 2 or more, a plurality of $R^1$ may be identical to or different from each other, and a plurality of $R^1$ may bond to each other to form a ring structure; M represents a divalent metal ion; and $R^{11}$ represents a monovalent hydrocarbon group.]

The monovalent hydrocarbon group represented by $R^{11}$ include alkyl group, cycloalkyl group, alkenyl group, aryl group, alkylaryl group, and aralkyl group. The monovalent hydrocarbon group represented by $R^{11}$ preferably has 1 to 20 carbon atoms.

(b1) the carboxylic acid represented by the structural formula (1) and/or the metal salt thereof is preferably a carboxylic acid represented by a structural formula (2) and/or a metal salt thereof.

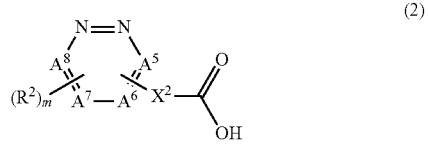

[In the formula (2), $A^5$ to $A^8$ each independently represents a nitrogen atom or a carbon atom; $X^2$ represents a single bond or a divalent hydrocarbon group having 1 to 20 carbon atoms; $R^2$ represents a hydrogen atom or a monovalent hydrocarbon group having 1 to 20 carbon atoms; it is noted that at least one of $A^5$ to $A^8$ is the carbon atom, at least one of $A^5$ to $A^8$ is the nitrogen atom, and $X^2$ and $R^2$ bond to the carbon atom; m represents an integer of 0 to 2; m is 0 when one of $A^5$ to $A^8$ is the carbon atom; m is 1 when two of $A^5$ to $A^8$ are the carbon atom; m is 2 when three of $A^5$ to $A^8$ are the carbon atom; and when m is 2 or more, a plurality of $R^2$ may be identical to or different from each other.]

Examples of the divalent hydrocarbon group represented by $X^2$ include alkylene group, cycloalkylene group, alkenylene group, and arylene group. Among them, the arylene group is preferable from the viewpoint of the affinity to the base rubber. The divalent hydrocarbon group represented by $X^2$ preferably has 1 to 20 carbon atoms.

The alkylene group preferably has 1 or more carbon atoms, more preferably 2 or more carbon atoms, and preferably has 20 or less carbon atoms, more preferably 10 or less carbon atoms. Examples of the alkylene group include methylene group, ethylene group, propylene group, butylene group, pentylene group, hexylene group, heptylene group, octylene group, and decylene group.

The cycloalkylene group preferably has 3 or more carbon atoms, more preferably 4 or more carbon atoms, and preferably has 20 or less carbon atoms, more preferably 10 or less carbon atoms. Examples of the cycloalkylene group include cyclopropylene group, cyclobutylene group, cyclopentylene group, cyclohexylene group, cycloheptylene group, cyclooctylene group, and cyclodecylene group.

The alkenylene group preferably has 2 or more carbon atoms, more preferably 3 or more carbon atoms, and preferably has 20 or less carbon atoms, more preferably 10 or less carbon atoms. Examples of the alkenylene group include ethenylene group, propenylene group, butenylene group, pentenylene group, hexenylene group, heptenylene group, octenylene group, and decenylene group.

The arylene group preferably has 6 or more carbon atoms, more preferably 7 or more carbon atoms, and preferably has 20 or less carbon atoms, more preferably 10 or less carbon atoms. Examples of the arylene group include phenylene group, and naphthylene group.

Examples of the monovalent hydrocarbon group represented by $R^2$ include alkyl group, cycloalkyl group, alkenyl group, aryl group, alkylaryl group, and aralkyl group. The monovalent hydrocarbon group represented by $R^2$ preferably has 1 to 20 carbon atoms.

The alkyl group preferably has 1 or more carbon atoms, more preferably 2 or more carbon atoms, and preferably has 20 or less carbon atoms, more preferably 10 or less carbon atoms. Examples of the alkyl group include methyl group, ethyl group, propyl group, butyl group, pentyl group, hexyl group, heptyl group, octyl group, and decyl group.

The cycloalkyl group preferably has 3 or more carbon atoms, more preferably 4 or more carbon atoms, and preferably has 20 or less carbon atoms, more preferably 10 or less carbon atoms. Examples of the cycloalkyl group include cyclopropyl group, cyclobutyl group, cyclopentyl group, cyclohexyl group, cycloheptyl group, cyclooctyl group, and cyclodecyl group.

The alkenyl group preferably has 2 or more carbon atoms, more preferably 3 or more carbon atoms, and preferably has 20 or less carbon atoms, more preferably 10 or less carbon atoms. Examples of the alkenyl group include ethenyl group, propenyl group, butenyl group, pentenyl group, hexenyl group, heptenyl group, octenyl group, and decenyl group.

The aryl group preferably has 6 or more carbon atoms, more preferably 7 or more carbon atoms, and preferably has 20 or less carbon atoms, more preferably 10 or less carbon atoms. Examples of the aryl group include phenyl group, and naphthyl group.

Specific examples of (b1) the carboxylic acid represented by the structural formula (1) and/or the metal salt thereof include carboxylic acids represented by structural formulae (3-1) to (3-11) and/or metal salts thereof.

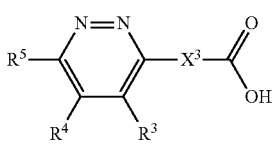

(3-1)

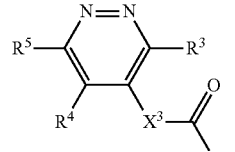

(3-2)

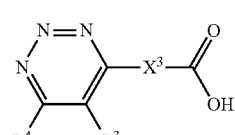

(3-3)

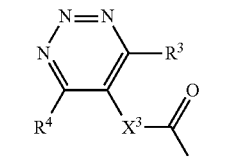

(3-4)

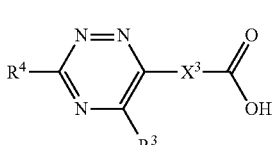

(3-5)

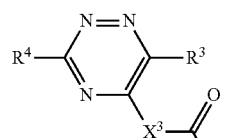

(3-6)

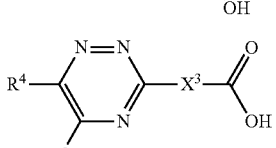

(3-7)

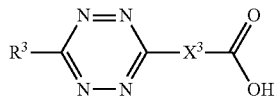

(3-8)

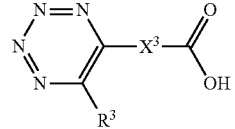

(3-9)

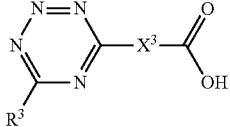

(3-10)

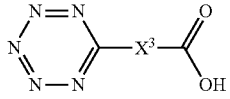

(3-11)

[In the formulae (3-1) to (3-11), $X^3$ represents a single bond or a divalent hydrocarbon group having 1 to 20 carbon atoms; and $R^3$ to $R^5$ represent a hydrogen atom or a monovalent hydrocarbon group having 1 to 20 carbon atoms.]

Examples of the divalent hydrocarbon group represented by $X^3$ include alkylene group, cycloalkylene group, alkenylene group, and arylene group. Among them, the arylene group is preferable from the viewpoint of the affinity to the base rubber. The divalent hydrocarbon group represented by $X^3$ preferably has 1 to 20 carbon atoms.

The monovalent hydrocarbon group represented by $R^3$ to $R^5$ include alkyl group, cycloalkyl group, alkenyl group, aryl group, alkylaryl group, and aralkyl group. The monovalent hydrocarbon group represented by $R^3$ to $R^5$ preferably has 1 to 20 carbon atoms.

Specific examples of the carboxylic acid represented by the structural formula (1) and/or the metal salt thereof include 4-(6-methyl-1,2,4,5-tetrazine-3-yl) benzoic acid (following formula (4-1)), 6-methyl-1,2,4,5-tetrazine-3-acetic acid (following formula (4-2)), 4-(6-methyl-1,2,4,5-tetrazine-3-yl)phenyl acetic acid (following formula (4-3)), and their metal salts.

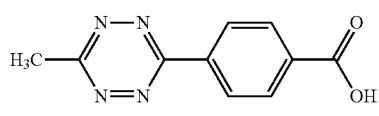

(4-1)

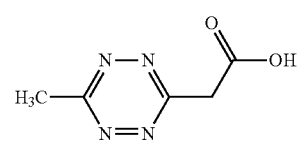

(4-2)

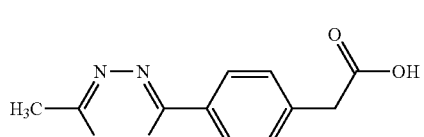

(4-3)

The carboxylic acid represented by the structural formula (1) and/or the metal salt thereof may be a commercial product or a newly synthesized one. The production method of the carboxylic acid represented by the structural formula (1) is disclosed, for example, in US Patent publication No. 2015/246893 A. In addition, the production method of the metal salt of the carboxylic acid represented by the structural formula (1) is disclosed, for example, in JP No. H05-345742 A.

The amount of (b1) the carboxylic acid represented by the structural formula (1) and/or the metal salt thereof in the rubber composition is preferably 5 parts by mass or more, more preferably 10 parts by mass or more, and even more preferably 40 parts by mass or more, and is preferably 200 parts by mass or less, more preferably 150 parts by mass or less, and even more preferably 120 parts by mass or less, with respect to 100 parts by mass of (a) the base rubber. If the amount of the component (b1) is 5 parts by mass or more, high resilience effect is obtained by forming crosslinking, and if the amount of the component (b1) is 200 parts by mass or less, crosslinking is not so much and thus shot feeling is good.

(b) The co-crosslinking agent may further contain a co-crosslinking agent other than (b1) the carboxylic acid represented by the structural formula (1) and/or the metal salt thereof, as long as the other co-crosslinking agent does not impair the effect of the present invention. Examples of the other co-crosslinking agent include (b2) an α,β-unsaturated carboxylic acid having 3 to 8 carbon atoms and/or a metal salt thereof. (b2) The α,β-unsaturated carboxylic acid having 3 to 8 carbon atoms and/or the metal salt thereof has an action of crosslinking a rubber molecule by graft polymerization to a base rubber molecular chain. Examples of the α,β-unsaturated carboxylic acid having 3 to 8 carbon atoms include acrylic acid, methacrylic acid, fumaric acid, maleic acid, and crotonic acid.

Examples of the metal constituting (b2) the metal salt of the α,β-unsaturated carboxylic acid having 3 to 8 carbon atoms include a monovalent metal ion such as sodium, potassium and lithium; a divalent metal ion such as magnesium, calcium, zinc, barium and cadmium; a trivalent metal ion such as aluminum; and other metal ion such as tin and zirconium. The metal component may be used solely or as a mixture of at least two of them. Among them, as the metal component, the divalent metal such as magnesium, calcium, zinc, barium and cadmium is preferable. This is because use of the divalent metal salt of the α,β-unsaturated carboxylic acid having 3 to 8 carbon atoms easily generates a metal crosslinking between the rubber molecules.

In the case that (b) the co-crosslinking agent contains (b2) the α,β-unsaturated carboxylic acid having 3 to 8 carbon atoms and/or the metal salt thereof, the molar ratio ((b2)/(b1)) of the mole number of the unsaturated carboxylic acid component of the component (b2) to the mole number of the carboxylic acid component of the component (b1) is preferably more than 0, more preferably 0.5 or more, and is preferably 15 or less, more preferably 10 or less, and even more preferably 1 or less. If the molar ratio ((b2)/(b1)) is 15 or less, crosslinking of the component (b1) can be formed.

The mole number of the carboxylic acid component of the component (b1) is the mole number of the carboxylic acid represented by the structural formula (1) included in the component (b1). For example, in the case that the component (b1) is a carboxylic acid, the carboxylic acid component included in 1 mole of the component (b1) is 1 mole, and in the case that the component (b1) is a divalent metal salt, the carboxylic acid component included in 1 mole of the component (b1) is 2 moles.

In the case that the other co-crosslinking agent is used, the amount of the carboxylic acid represented by the structural formula (1) and/or the metal salt thereof in (b) the co-crosslinking agent is 14 mass % or more, preferably 17 mass % or more, more preferably 40 mass % or more, and is preferably 100 mass % or less, more preferably 60 mass % or less. If the amount of the carboxylic acid represented by the structural formula (1) and/or the metal salt thereof falls within the above range, a metal crosslinking is easily generated.

The amount of (b) the co-crosslinking agent in the rubber composition is preferably 10 parts by mass or more, more preferably 15 parts by mass or more, and even more preferably 20 parts by mass or more, and is preferably 50 parts by mass or less, more preferably 45 parts by mass or less, and even more preferably 40 parts by mass or less, with respect to 100 parts by mass of (a) the base rubber. If the amount of (b) the co-crosslinking agent is less than 10 parts by mass, the amount of (c) the crosslinking initiator which will be explained below must be increased in order to obtain an appropriate hardness of the member formed from the rubber composition, which tends to lower the resilience of the crosslinked rubber molded product. On the other hand, if the amount of (b) the co-crosslinking agent exceeds 50 parts by mass, the member formed from the rubber composition tends to become excessively hard.

(c) Crosslinking Initiator

The rubber composition may further contain (c) a crosslinking initiator. Particularly, in the case that the component (b2) is contained, (c) the crosslinking initiator is preferably contained. As (c) the crosslinking initiator, an organic peroxide is suitable. Specific examples of the organic peroxide include an organic peroxide such as dicumyl peroxide, 1,1-bis(t-butylperoxy)-3,3,5-trimethylcyclohexane, 2,5-dimethyl-2,5-di(t-butylperoxy)hexane and di-t-butylperoxide. These organic peroxides may be used solely or, or two or more of them may be used in combination. Among them, dicumyl peroxide is preferably used.

The amount of (c) the crosslinking initiator is preferably 0.2 part by mass or more, more preferably 0.5 part by mass or more, and is preferably 5.0 parts by mass or less, more preferably 2.5 parts by mass or less, and even more preferably 0.8 parts by mass or less, with respect to 100 parts by mass of (a) the base rubber. If the amount of (c) the crosslinking initiator is less than 0.2 part by mass, the member formed from the rubber composition becomes so soft that the resilience of the golf ball may be lowered. If the amount of (c) the crosslinking initiator exceeds 5.0 parts by mass, the amount of (b) the co-crosslinking agent which has been explained above must be decreased in order to obtain an appropriate hardness of the member formed from the rubber composition, which may lower the resilience of the golf ball or worsen the durability of the golf ball.

(d) Metal Compound

In the case that (b) the co-crosslinking agent is not a metal salt, (d) a metal compound is preferably further contained. (d) The metal compound is not particularly limited, as long as it can neutralize the carboxylic acid component added as (b) the co-crosslinking agent in the rubber composition. (d) The metal compound includes, for example, a metal hydroxide such as magnesium hydroxide, zinc hydroxide, calcium hydroxide, sodium hydroxide, lithium hydroxide, potassium hydroxide and copper hydroxide: a metal oxide such as magnesium oxide, calcium oxide, zinc oxide and copper oxide; and a metal carbonate such as magnesium carbonate, zinc carbonate, calcium carbonate, sodium carbonate, lithium carbonate and potassium carbonate. (d) The metal compound is preferably a divalent metal compound, more preferably a zinc compound. This is because the divalent metal compound reacts with the α,β-unsaturated carboxylic acid having 3 to 8 carbon atoms, thereby forming a metal crosslinking. Further, use of the zinc compound provides a golf ball with higher resilience. (d) The metal compound may be used solely, or two or more of them may be used in combination.

(e) Organic Sulfur Compound

The rubber composition may further contain (e) an organic sulfur compound. Examples of (e) the organic sulfur compound include at least one member selected from the group consist of thiophenols, thionaphthols, polysulfides, thiurams, thiocarboxylic acids, dithiocarboxylic acids, sulfenamides, dithiocarbamates, thiazoles, and their metal salts. From the viewpoint of greater hardness distribution of the spherical core, (e) the organic sulfur compound preferably includes an organic sulfur compound having a thiol group (—SH) or a metal salt thereof, more preferably includes thiophenols, thionaphthols, or their metal salts.

Examples of the thiols include thiophenols and thionaphthols. The thiophenols include, for example, thiophenol; thiophenols substituted with a fluoro group, such as 4-fluorothiophenol, 2,5-difluorothiophenol, 2,6-difluorothiophenol, 2,4,5-trifluorothiophenol, 2,4,5,6-tetrafluorothiophenol and pentafluorothiophenol; thiophenols substituted with a chloro group, such as 2-chlorothiophenol, 4-chlorothiophenol, 2,4-dichlorothiophenol, 2,5-dichlorothiophenol, 2,6-dichlorothiophenol, 2,4,5-trichlorothiophenol, 2,4,5,6-tetrachlorothiophenol and pentachlorothiophenol; thiophenols substituted with a bromo group, such as 4-bromothiophenol, 2,5-dibromothiophenol, 2,6-dibromothiophenol, 2,4,5-tribromothiophenol, 2,4,5,6-tetrabromothiophenol and pentabromothiophenol; thiophenols substituted with an iodo group, such as 4-iodothiophenol, 2,5-diiodothiophenol, 2,6-diiodothiophenol, 2,4,5-triiodothiophenol, 2,4,5,6-tetraiodothiophenol and pentaiodothiophenol; and their metal salts. As the metal salt, a zinc salt is preferable.

Examples of the thionaphthols (naphthalenethiols) include 2-thionaphthol, 1-thionaphthol, 1-chloro-2-thionaphthol, 2-chloro-1-thionaphthol, 1-bromo-2-thionaphthol, 2-bromo-1-thionaphthol, 1-fluoro-2-thionaphthol, 2-fluoro-1-thionaphthol, 1-cyano-2-thionaphthol, 2-cyano-1-thionaphthol, 1-acetyl-2-thionaphthol, 2-acetyl-1-thionaphthol, and their metal salts. Among them, 2-thionaphthol, 1-thionaphthol, and their metal salts are preferable. As the metal salt, a divalent metal salt is preferable, a zinc salt is more preferable. Specific examples of the metal salt include zinc salt of 1-thionaphthol and zinc salt of 2-thionaphthol.

The polysulfides are organic sulfur compounds having a polysulfide bond, and include, for example, disulfides, trisulfides and tetrasulfides. The polysulfides are preferably diphenylpolysulfides.

Examples of the diphenylpolysulfides include diphenyldisulfide; diphenyldisulfides substituted with a halogen group, such as bis(4-fluorophenyl)disulfide, bis(2,5-difluorophenyl)disulfide, bis(2,6-difluorophenyl)disulfide, bis(2,4,5-trifluorophenyl)disulfide, bis(2,4,5,6-tetrafluorophenyl)disulfide, bis(pentafluorophenyl)disulfide, bis(4-chlorophenyl)disulfide, bis(2,5-dichlorophenyl)disulfide, bis(2,6-dichlorophenyl)disulfide, bis(2,4,5-trichlorophenyl)disulfide, bis(2,4,5,6-tetrachlorophenyl)disulfide, bis(pentachlorophenyl)disulfide, bis(4-bromophenyl)disulfide, bis(2,5-dibromophenyl)disulfide, bis(2,6-dibromophenyl)disulfide, bis(2,4,5-tribromophenyl)disulfide, bis(2,4,5,6-tetrabromophenyl)disulfide, bis(pentabromophenyl)disulfide, bis(4-iodophenyl)disulfide, bis(2,5-diiodophenyl)disulfide, bis(2,6-diiodophenyl)disulfide, bis(2,4,5-triiodophenyl)disulfide, and bis(2,4,5,6-tetraiodophenyl)disulfide, bis(pentaiodophenyl)disulfide; and diphenyldisulfides substituted with an alkyl group, such as bis(4-methylphenyl)disulfide, bis(2,4,5-trimethylphenyl)disulfide, bis(pentamethylphenyl)disulfide, bis(4-t-butylphenyl)disulfide, bis(2,4,5-tri-t-butylphenyl)disulfide, and bis(penta-t-butylphenyl)disulfide.

The thiurams include, for example, thiuram monosulfides such as tetramethylthiuram monosulfide; thiuram disulfides such as tetramethylthiuram disulfide, tetraethylthiuram disulfide, and tetrabutylthiuram disulfide; and thiuram tetrasulfides such as dipentamethylenethiuram tetrasulfide. The thiocarboxylic acids include, for example, naphthalene thiocarboxylic acid. The dithiocarboxylic acids include, for example, naphthalene dithiocarboxylic acid. The sulfenamides include, for example, N-cyclohexyl-2-benzothiazole sulfenamide, N-oxydiethylene-2-benzothiazole sulfenamide, and N-t-butyl-2-benzothiazole sulfenamide.

(e) The organic sulfur compound may be used solely, or two or more of them may be used in combination. (e) The organic sulfur compound is preferably at least one member selected from the group consisting of the thiophenols and/or the metal salt thereof, the thionaphthols and/or the metal salt thereof, the diphenyldisulfides, and the thiuramdisulfides. (e) The organic sulfur compound more preferably includes 2,4-dichlorothiophenol, 2,6-difluorothiophenol, 2,6-dichlorothiophenol, 2,6-dibromothiophenol, 2,6-diiodothiophenol, 2,4,5-trichlorothiophenol, pentachlorothiophenol, 1-thionaphthol, 2-thionaphthol, diphenyl disulfide, bis(2,6-difluorophenyl)disulfide, bis(2,6-dichlorophenyl)disulfide, bis(2,6-dibromophenyl)disulfide, bis(2,6-diiodophenyl)disulfide, or bis(pentabromophenyl)disulfide.

The amount of (e) the organic sulfur compound is preferably 0.05 part by mass or more, more preferably 0.1 part by mass or more, and is preferably 5.0 parts by mass or less, more preferably 2.0 parts by mass or less, with respect to 100 parts by mass of (a) the base rubber. If the amount of (e) the organic sulfur compound is less than 0.05 part by mass, the effect of adding (e) the organic sulfur compound is not obtained, and thus the resilience of the golf ball may not improve. In addition, if the amount of (e) the organic sulfur compound exceeds 5.0 parts by mass, the obtained golf ball has excessively great compression deformation amount, and thus the resilience thereof may be lowered.

(f) Carboxylic Acid and/or Salt Thereof

The rubber composition may contain (f) a carboxylic acid and/or a salt thereof. If (f) the carboxylic acid and/or the salt thereof is contained, the obtained spherical core has a greater outer-hard inner-soft degree. Examples of (f) the carboxylic acid and/or the salt thereof include an aliphatic carboxylic acid, an aliphatic carboxylic acid salt, an aromatic carboxylic acid, and an aromatic carboxylic acid salt. (f) The carboxylic acid and/or the salt may be used solely, or two or more of them may be used in combination. It is noted that (f) the carboxylic acid and/or the salt thereof differs from the compound used in (b) the co-crosslinking agent, and excludes (b1) the carboxylic acid represented by the structural formula (1) and the metal salt thereof and (b2) the α,β-unsaturated carboxylic acid having 3 to 8 carbon atoms and/or the metal salt thereof.

The aliphatic carboxylic acid may be either a saturated aliphatic carboxylic acid (hereinafter referred to as "saturated fatty acid" occasionally) or an unsaturated aliphatic carboxylic acid (hereinafter referred to as "unsaturated fatty acid" occasionally). In addition, the aliphatic carboxylic acid may have a branched structure or a cyclic structure. The saturated fatty acid preferably has 1 or more carbon atoms, and preferably has 30 or less carbon atoms, more preferably 18 or less carbon atoms, and even more preferably 13 or less carbon atoms. The unsaturated fatty acid preferably has 5 or more carbon atoms, more preferably 7 or more carbon atoms, and even more preferably 8 or more carbon atoms, and preferably has 30 or less carbon atoms, more preferably 18 or less carbon atoms, and even more preferably 13 or less carbon atoms.

Examples of the aromatic carboxylic acid include a carboxylic acid having a benzene ring in the molecule, and a carboxylic acid having an aromatic heterocycle in the molecule. The aromatic carboxylic acid may be used solely, or two or more of them may be used in combination. Examples of the carboxylic acid having the benzene ring include an aromatic carboxylic acid having a carboxyl group directly bonding to a benzene ring, an aromatic-aliphatic carboxylic acid having an aliphatic carboxylic acid bonding to a benzene ring, a polynuclear aromatic carboxylic acid having a carboxyl group directly bonding to a fused benzene ring, and a polynuclear aromatic-aliphatic carboxylic acid having an aliphatic carboxylic acid bonding to a fused benzene ring. Examples of the carboxylic acid having the aromatic heterocycle include an aromatic carboxylic acid having a carboxyl group directly bonding to an aromatic heterocycle.

As the aliphatic carboxylic acid salt or aromatic carboxylic acid salt, the above listed salt of the aliphatic carboxylic acid or aromatic carboxylic acid can be used. Examples of the cation component of these salts include a metal ion, an ammonium ion and an organic cation. Examples of the metal ion include a monovalent metal ion such as sodium, potassium, lithium and silver; a divalent metal ion such as magnesium, calcium, zinc, barium, cadmium, copper, cobalt, nickel and manganese; a trivalent metal ion such as aluminum and iron; and other ion such as tin, zirconium and titanium. The cation component may be used solely, or two or more of them may be used in combination.

The organic cation is a cation having a carbon chain. Examples of the organic cation include, but is not limited to, an organic ammonium ion. Examples of the organic ammonium ion include a primary ammonium ion such as stearyl ammonium ion, hexyl ammonium ion, octyl ammonium ion and 2-ethylhexyl ammonium ion; a secondary ammonium ion such as dodecyl (lauryl) ammonium ion and octadecyl (stearyl) ammonium ion; a tertiary ammonium ion such as trioctyl ammonium ion: and a quaternary ammonium ion such as dioctyldimethyl ammonium ion and distearyldimethyl ammonium ion. These organic cations may be used solely, or two or more of them may be used in combination.

Examples of the aliphatic carboxylic acid and/or the salt thereof include a saturated fatty acid and/or a salt thereof, and an unsaturated fatty acid and/or a salt thereof. The saturated fatty acid and/or the salt thereof is preferable, and preferable examples thereof include caprylic acid (octanoic acid), pelargonic acid (nonanoic acid), capric acid (decanoic acid), lauric acid, myristic acid, palmitic acid, stearic acid, behenic acid, and their potassium salt, magnesium salt, calcium salt, aluminum salt, zinc salt, iron salt, copper salt, nickel salt, cobalt salt. Preferable examples of the unsaturated fatty acid and/or the salt thereof include palmitoleic acid, oleic acid, linoleic acid, arachidonic acid, and their potassium salt, magnesium salt, calcium salt, aluminum salt, zinc salt, iron salt, copper salt, nickel salt, or cobalt salt.

Particularly preferable examples of the aromatic carboxylic acid and/or the salt thereof include benzoic acid, butylbenzoic acid, anisic acid (methoxybenzoic acid), dimethoxybenzoic acid, trimethoxybenzoic acid, dimethylaminobenzoic acid, chlorobenzoic acid, dichlorobenzoic acid, trichlorobenzoic acid, acetoxybenzoic acid, biphenylcarboxylic acid, naphthalenecarboxylic acid, anthracenecarboxylic acid, furancarboxylic acid, thenoic acid, and their potassium salt, magnesium salt, calcium salt, aluminum salt, zinc salt, iron salt, copper salt, nickel salt, or cobalt salt.

The amount of (f) the carboxylic acid and/or the salt thereof is preferably, for example, 0.5 part by mass or more, more preferably 1.0 part by mass or more, and even more preferably 1.5 parts by mass or more, and is preferably 40 parts by mass or less, more preferably 35 parts by mass or less, and even more preferably 30 parts by mass or less, with respect to 100 parts by mass of (a) the base rubber. If the amount of (f) the carboxylic acid and/or the salt thereof is 0.5 part by mass or more, the spherical core has a greater outer-hard inner-soft degree, and if the amount of (f) the carboxylic acid and/or the salt thereof is 40 parts by mass or less, lowering in the core hardness is suppressed, and the resilience becomes better.

The rubber composition may further contain additives such as a pigment, a filler for adjusting a weight or the like, an antioxidant, a peptizing agent, a softening agent, or the like, where necessary. In addition, the rubber composition may contain rubber powder obtained by pulverizing a golf ball core or offcuts produced when preparing a core.

The pigment blended into the rubber composition includes, for example, a white pigment, a blue pigment and a purple pigment. As the white pigment, titanium oxide is preferably used. The type of titanium oxide is not particularly limited, but rutile type is preferably used because of the high opacity. In addition, the amount of titanium oxide is preferably 0.5 part by mass or more, more preferably 2 parts by mass or more, and is preferably 8 parts by mass or less, more preferably 5 parts by mass or less, with respect to 100 parts by mass of (a) the base rubber.

It is also preferable that the rubber composition contains both a white pigment and a blue pigment. The blue pigment is blended in order to cause white color to be vivid, and examples thereof include ultramarine blue, cobalt blue, and phthalocyanine blue. In addition, examples of the purple pigment include anthraquinone violet, dioxazine violet, and methyl violet.

The filler blended in the rubber composition is used as a weight adjusting agent for mainly adjusting the weight of the golf ball obtained as a final product. The filler may be blended where necessary. Examples of the filler include an inorganic filler such as zinc oxide, barium sulfate, calcium carbonate, magnesium oxide, tungsten powder, and molybdenum powder.

The amount of the antioxidant is preferably 0.1 part by mass or more and 1 part by mass or less with respect to 100 parts by mass of (a) the base rubber. In addition, the amount of the peptizing agent is preferably 0.1 part by mass or more and 5 parts by mass or less with respect to 100 parts by mass of (a) the base rubber.

Preparation of Rubber Composition

The rubber composition used in the present invention can be obtained by mixing and kneading (a) the base rubber, (b) the co-crosslinking agent, and other additives where necessary. The kneading method is not particularly limited, for example, the kneading can be conducted with a conventional kneading machine such as a kneading roll, a banbury mixer, and a kneader.

The spherical core of the golf ball according to the present invention can be obtained by molding the kneaded rubber composition in a mold. The temperature of molding the spherical core is preferably 100° C. or more, more preferably 110° C. or more, and even more preferably 120° C. or more, and is preferably 170° C. or less. If the molding temperature exceeds 170° C., the core surface hardness tends to be lowered. In addition, the pressure when performing the molding preferably ranges from 2.9 MPa to 11.8 MPa, and the molding time preferably ranges from 10 min to 60 min.

The spherical core preferably has a diameter of 34.8 mm or more, more preferably 36.8 mm or more, and even more preferably 38.8 mm or more, and preferably has a diameter of 42.2 mm or less, more preferably 41.8 mm or less, even more preferably 41.2 mm or less, and most preferably 40.8 mm or less. If the spherical core has a diameter of 34.8 mm or more, the thickness of the cover does not become too thick and thus the resilience becomes better. On the other hand, if the spherical core has a diameter of 42.2 mm or less, the thickness of the cover does not become too thin and thus the cover functions better.

When the spherical core has a diameter in a range from 34.8 mm to 42.2 mm, the compression deformation amount of the spherical core (shrinking amount of the spherical core along the compression direction) when applying a load from an initial load of 98 N to a final load of 1275 N is preferably 2.0 mm or more, more preferably 2.8 mm or more, and is preferably 6.0 mm or less, more preferably 5.0 mm or less. If the compression deformation amount is 2.0 mm or more, the shot feeling becomes better. If the compression deformation amount is 6.0 mm or less, the resilience becomes better.

Cover

The cover is formed from a cover composition containing a resin component. Examples of the resin component include an ionomer resin; a thermoplastic polyurethane elastomer having a trade name of "Elastollan (registered trademark)" available from BASF Japan Ltd.; a thermoplastic polyamide elastomer having a trade name of "Pebax (registered trademark)" available from Arkema K. K.; a thermoplastic polyester elastomer having a trade name of "Hytrel (registered trademark)" available from Du Pont-Toray Co., Ltd.; and a thermoplastic styrene elastomer having a trade name of "Rabalon (registered trademark)" available from Mitsubishi Chemical Corporation.

Examples of the ionomer resin include a product prepared by neutralizing at least a part of carboxyl groups in a binary copolymer composed of an olefin and an α,β-unsaturated carboxylic acid having 3 to 8 carbon atoms with a metal ion; a product prepared by neutralizing at least a part of carboxyl groups in a ternary copolymer composed of an olefin, an α,β-unsaturated carboxylic acid having 3 to 8 carbon atoms and an α,β-unsaturated carboxylic acid ester with a metal ion; and a mixture of those. As the olefin, an olefin having 2 to 8 carbon atoms is preferable. Examples of the olefin include ethylene, propylene, butene, pentene, hexene, heptene, and octene. Ethylene is particularly preferable. Examples of the α,β-unsaturated carboxylic acid having 3 to 8 carbon atoms include acrylic acid, methacrylic acid, fumaric acid, maleic acid and crotonic acid. Acrylic acid and methacrylic acid are particularly preferable. In addition, examples of the α,β-unsaturated carboxylic acid ester include methyl ester, ethyl ester, propyl ester, n-butyl ester, isobutyl ester of acrylic acid, methacrylic acid, fumaric acid, maleic acid and the like. Acrylic acid ester and methacrylic acid ester are particularly preferable. Among these, the ionomer resin is preferably a metal ion-neutralized product of a binary copolymer composed of ethylene and (meth) acrylic acid, and a metal ion-neutralized product of a ternary copolymer composed of ethylene, (meth)acrylic acid and (meth)acrylic acid ester.

Specific examples of the ionomer resin include "Himilan (registered trademark) (e.g. a binary copolymerized ionomer resin such as Himilan 1555 (Na), Himilan 1557 (Zn), Himilan 1605 (Na), Himilan 1706 (Zn), Himilan 1707 (Na), Himilan AM3711 (Mg); and a ternary copolymerized ionomer resin such as Himilan 1856 (Na), Himilan 1855 (Zn))" available from Du Pont-Mitsui Polychemicals Co., Ltd.

Further, examples of the ionomer resin also include "Surlyn (registered trademark) (e.g. a binary copolymerized ionomer resin such as Surlyn 8945 (Na), Surlyn 9945 (Zn), Surlyn 8140 (Na), Surlyn 8150 (Na), Surlyn 9120 (Zn), Surlyn 9150 (Zn), Surlyn 6910 (Mg), Surlyn 6120 (Mg), Surlyn 7930 (Li), Surlyn 7940 (Li), Surlyn AD8546 (Li); and a ternary copolymerized ionomer resin such as Surlyn 8120 (Na), Surlyn 8320 (Na), Surlyn 9320 (Zn), Surlyn 6320 (Mg), HPF 1000 (Mg), HPF 2000 (Mg))" available from E.I. du Pont de Nemours and Company.

Further, examples of the ionomer resin also include "Iotek (registered trademark) (e.g. a binary copolymerized ionomer resin such as Iotek 8000 (Na), Iotek 8030 (Na), Iotek 7010 (Zn). Iotek 7030 (Zn); and a ternary copolymerized ionomer resin such as Iotek 7510 (Zn), Iotek 7520 (Zn))" available from ExxonMobil Chemical Corporation.

It is noted that Na, Zn, Li, Mg or the like described in the parentheses after the trade name of the ionomer resin indicates a metal ion type for neutralizing the ionomer resin. The ionomer resin may be used solely, or two of more of them may be used in combination.

The cover composition constituting the cover preferably contains, as a resin component, a thermoplastic polyurethane elastomer or an ionomer resin. In case of using the ionomer resin, it is also preferable to use a thermoplastic styrene elastomer in combination. The amount of the polyurethane or ionomer resin in the resin component of the cover composition is preferably 50 mass % or more, more preferably 60 mass % or more, and even more preferably 70 mass % or more.

In addition to the above resin component, the cover composition may further contain a pigment component such as a white pigment (e.g. titanium oxide), a blue pigment and a red pigment: a weight adjusting agent such as zinc oxide, calcium carbonate and barium sulfate; a dispersant; an antioxidant; an ultraviolet absorber; a light stabilizer; a fluorescent material or fluorescent brightener, or the like, as long as they do not impair the performance of the cover.

The amount of the white pigment (e.g. titanium oxide) is preferably 0.5 part by mass or more, more preferably 1 part by mass or more, and is preferably 10 parts by mass or less, more preferably 8 parts by mass or less, with respect to 100 parts by mass of the resin component constituting the cover. If the amount of the white pigment is 0.5 part by mass or more, it is possible to impart the opacity to the cover. Further, if the amount of the white pigment exceeds 10 parts by mass, the durability of the obtained cover may deteriorate.

It is preferred that the slab hardness of the cover composition is appropriately set in accordance with the desired performance of the golf ball. For example, in case of a so-called distance golf ball which focuses on a flight distance, the cover composition preferably has a slab hardness of 50 or more, more preferably 55 or more, and even more preferably 60 or more, and preferably has a slab hardness of 80 or less, more preferably 70 or less, and even more preferably 68 or less in Shore D hardness. If the cover composition has a slab hardness of 50 or more, the obtained golf ball has a higher launch angle and lower spin rate on driver shots and iron shots, and thus travels a greater flight distance. Further, if the cover composition has a slab hardness of 80 or less, the golf ball excellent in durability is obtained. In addition, in case of a so-called spin golf ball which focuses on controllability, the cover composition preferably has a slab hardness of less than 50, and preferably has a slab hardness of 20 or more, more preferably 25 or more, and even more preferably 30 or more in Shore D hardness. If the cover composition has a slab hardness of less than 50 in Shore D hardness, the flight distance on driver shots can be improved by the core of the present invention, as well as the obtained golf ball readily stops on the green due to the high spin rate on approach shots. Further, if the cover composition has a slab hardness of 20 or more, the abrasion resistance becomes better. In case of a plurality of cover layers, the slab hardness of the cover composition constituting each layer may be identical to or different from each other, as long as the slab hardness of each layer falls within the above range.

Examples of the method for molding the cover include a method which comprises molding the cover composition into a hollow-shell, covering the core with a plurality of the hollow-shells and subjecting the core with a plurality of the hollow shells to the compression molding (preferably a method which comprises molding the cover composition into a half hollow-shell, covering the core with two of the half hollow-shells, and subjecting the core with two of the half hollow-shells to the compression molding); and a method which comprises injection molding the cover composition directly onto the core.

When molding the cover in the compression molding method, molding of the half shell may be conducted by either a compression molding method or an injection molding method, but the compression molding method is preferred. The compression molding of the cover composition into the half shell can be carried out, for example, under a pressure of 1 MPa or more and 20 MPa or less at a temperature of −20° C. or more and 70° C. or less relative to the flow beginning temperature of the cover composition. By performing the molding under the above conditions, a half shell having a uniform thickness can be formed. Examples of the method for molding the cover using half shells include a method of covering the core with two of the half shells and then subjecting the core with two of the half shells to the compression molding. The compression molding of the half shells into the cover can be carried out, for example, under a pressure of 0.5 MPa or more and 25 MPa or less at a temperature of −20° C. or more and 70° C. or less relative to the flow beginning temperature of the cover composition. By performing the molding under the above conditions, a golf ball cover having a uniform thickness can be formed.

In case of injection molding the cover composition into the cover, the cover composition extruded in a pellet form beforehand may be used for the injection molding, or the cover materials such as the base resin components and the pigment may be dry blended, followed by directly injection molding the blended material. It is preferred to use upper and lower molds having a hemispherical cavity and pimples for forming the cover, wherein a part of the pimples also serves as a retractable hold pin. When molding the cover by the injection molding, the hold pin is protruded to hold the core, and the cover composition is charged and then cooled to obtain the cover. For example, the molding of the cover may be conducted as follows: the cover composition heated to a temperature ranging from 200° C. to 250° C. is charged for 0.5 to 5 seconds into a mold held under a pressure of 9 MPa to 15 MPa, and after cooling for 10 to 60 seconds, the mold is opened.

When molding the cover, concave portions called "dimple" are usually formed on the surface of the cover. The total number of dimples formed on the cover is preferably 200 or more and 500 or less. If the total number is less than 200, the dimple effect is hardly obtained. On the other hand, if the total number exceeds 500, the dimple effect is hardly obtained because the size of the respective dimples is small. The shape (shape in a plan view) of dimples includes, for example, without limitation, a circle, a polygonal shape such as a roughly triangular shape, a roughly quadrangular shape, a roughly pentagonal shape, a roughly hexagonal shape, and other irregular shape. The shape of dimples is employed solely or at least two of them may be used in combination.

The thickness of the cover is preferably 4.0 mm or less, more preferably 3.0 mm or less, and even more preferably 2.0 mm or less. If the thickness of the cover is 4.0 mm or less, the resilience and shot feeling of the obtained golf ball become better. The thickness of the cover is preferably 0.3 mm or more, more preferably 0.5 mm or more, even more preferably 0.8 mm or more, and most preferably 1.0 mm or more. If the thickness of the cover is less than 0.3 mm, the durability and wear resistance of the cover may deteriorate. In the case that the cover has a plurality of layers, it is preferred that the total thickness of the cover layers falls within the above range.

The golf ball body having the cover formed thereon is ejected from the mold, and is preferably subjected to surface treatments such as deburring, cleaning and sandblast where necessary. In addition, if desired, a paint film or a mark may be formed. The paint film preferably has a thickness of, but is not particularly limited to, 5 μm or more, more preferably 7 μm or more, and preferably has a thickness of 50 μm or less, more preferably 40 μm or less, even more preferably 30 μm or less. If the thickness of the paint film is less than 5 μm, the paint film is easy to wear off due to the continued use of the golf ball, and if the thickness of the paint film exceeds 50 μm, the dimple effect is reduced and thus the flight performance of the golf ball may be lowered.

Golf Ball

The golf ball construction of the present invention is not particularly limited, as long as the golf ball comprises a spherical core and at least one cover covering the spherical core. The spherical core preferably has a single layered structure. Unlike the multi-layered structure, the spherical core of the single layered structure does not have energy loss at the interface of the multi-layered structure when being hit, and thus has a higher resilience. In addition, the cover has a structure of at least one layer, for example, a single layered structure, or a multi-layered structure of at least two layers. The golf ball of the present invention includes, for example, a two-piece golf ball comprising a spherical core and a single layered cover disposed around the spherical core; a multi-piece golf ball (including a three-piece golf ball) comprising a spherical core and at least two cover layers disposed around the spherical core; and a wound golf ball comprising a spherical core, a rubber thread layer which is formed around the spherical core, and a cover disposed over the rubber thread layer. The present invention can be suitably applied to any one of the above golf ball.

The golf ball of the present invention preferably has a diameter ranging from 40 mm to 45 mm. In light of satisfying a regulation of US Golf Association (USGA), the diameter is particularly preferably 42.67 mm or more. In light of prevention of air resistance, the diameter is more preferably 44 mm or less, particularly preferably 42.80 mm or less. In addition, the golf ball of the present invention preferably has a mass of 40 g or more and 50 g or less. In light of obtaining greater inertia, the mass is more preferably 44 g or more, particularly preferably 45.00 g or more. In light of satisfying a regulation of USGA, the mass is particularly preferably 45.93 g or less.

When the golf ball of the present invention has a diameter in a range from 40 mm to 45 mm, the compression deformation amount of the golf ball (shrinking amount of the golf ball along the compression direction) when applying a load from 98 N as an initial load to 1275 N as a final load to the golf ball is preferably 2.0 mm or more, more preferably 2.2 mm or more, and even more preferably 2.4 mm or more, and is preferably 4.0 mm or less, more preferably 3.5 mm or less, and even more preferably 3.4 mm or less. If the compression deformation amount is 2.0 mm or more, the golf ball does not become excessively hard, and thus the shot feeling thereof becomes better. On the other hand, if the compression deformation amount is 4.0 mm or less, the resilience of the golf ball becomes higher.

The FIGURE is a partially cutaway sectional view showing a golf ball 1 according to an embodiment of the present invention. The golf ball 1 comprises a spherical core 2, and a cover 3 covering the spherical core 2. A plurality of dimples 31 are formed on the surface of the cover. Other portion than the dimples 31 on the surface of the golf ball 1 is a land 32. The golf ball 1 is provided with a paint layer and a mark layer outside the cover 3, but these layers are not depicted.

EXAMPLES

Next, the present invention will be described in detail by way of examples. However, the present invention is not limited to the examples described below. Various changes and modifications without departing from the spirit of the present invention are included in the scope of the present invention.

Evaluation Methods (1) Compression Deformation Amount (mm)

A compression deformation amount of the core or golf ball (a shrinking amount of the core or golf ball along the compression direction), when applying a load from an initial load of 98 N to a final load of 1275 N to the core or golf ball, was measured.

(2) Coefficient of Restitution

A metal cylindrical object with a mass of 198.4 g was allowed to collide with each core at a speed of 40 m/sec, and the speeds of the cylindrical object and the core before and after the collision were measured. Based on these speeds and the mass of each object, the coefficient of restitution of each core was calculated. The measurement was conducted using twelve samples for each core, and the average value thereof was adopted as the coefficient of restitution for that core. It is noted that the coefficient of restitution of each core is shown as a difference from the coefficient of restitution of the core of the golf ball No. 1 (coefficient of restitution difference=coefficient of restitution of each core–coefficient of restitution of core of golf ball No. 1).

(3) Flight Distance on Driver Shots (yd)

A W #1 driver provided with a metal head (XXIO S, loft angel: 11°, available from Dunlop Sports Limited) was installed on a swing robot M/C available from Golf Laboratories, Inc. The golf ball was hit at a head speed of 40 m/sec, and the flight distance (the distance from the launch point to the stop point) thereof was measured. The measurement was conducted twelve times for each golf ball, and the average value thereof was adopted as the measurement value for that golf ball. It is noted that the flight distance of each golf ball is shown as a difference from the flight distance of the golf ball No. 1 (flight distance difference=flight distance of each golf ball–flight distance of golf ball No. 1).

(4) Shot Feeling

An actual hitting test was carried out by ten amateur golfers (high skilled persons) using a driver. In accordance with the following grading standard, the feeling of each golfer at hitting the golf ball was evaluated. The shot feeling most evaluated by the ten golfers was adopted as the shot feeling of that golf ball.

Grading Standard

G (good): Impact is low and feeling is good.

F (Fair): Normal

P (Poor): Impact is great and feeling is bad.

Preparation of Zinc Salt of 4-(6-methyl-1,2,4,5-tetrazine-3-yl) benzoic acid

Under a nitrogen atmosphere, 34.02 g of hydrazine monohydrate was added in a mixture of 2.00 g of 4-cyanobenzoic acid, 5.58 g of acetonitrile and 2.47 g of zinc triflate. The obtained solution was heated at 60° C. for 24 hours under a nitrogen atmosphere in an oil tank. After the solution was cooled, a sodium nitrite aqueous solution (sodium nitrite: 18.76 g, water: 54.42 g) was added. Hydrochloric acid (concentration: 5 mass %) was slowly added in the solution to adjust pH to 3. After that, the solution was stirred for 15 minutes and the precipitate was filtered out. The residue was washed three times with hydrochloric acid (concentration: 1 mass %) and then dried to obtain a crude product. Recrystallization was conducted with a solvent of dichloromethane/methanol=5/1 to obtain 4-(6-methyl-1,2,4,5-tetrazine-3-yl) benzoic acid.

The above 4-(6-methyl-1,2,4,5-tetrazine-3-yl) benzoic acid was charged into a sodium hydroxide aqueous solution (sodium hydroxide: 0.11 g, water: 13.04 g), and dissolved therein under stirring. Subsequently, while the solution was being strongly stirred, a zinc chloride aqueous solution (zinc chloride: 0.119 g, water, 6.52 g) was added dropwise for one hour. After the dropwise addition was finished, the liquid was stirred at room temperature for two hours, 6.52 g of water was added, and the obtained liquid was heated to 60° C. and stirred for two hours. After that, the liquid was cooled to room temperature and left overnight. Then, the precipitate was filtered out, and the residue was washed five times with 500 g of water under stirring. The washed precipitate was naturally dried to obtain zinc salt of 4-(6-methyl-1,2,4,5-tetrazine-3-yl) benzoic acid.

[Production of Golf Ball]

(1) Production of Core

The rubber compositions having the formulations shown in Table 1 were kneaded, and heat pressed in upper and lower molds, each having a hemispherical cavity, at 170° C. for 20 minutes to obtain spherical cores having a diameter of 39.8 mm. It is noted that barium sulfate was added in an appropriate amount such that the obtained golf balls have a mass of 45.4 g.

TABLE 1

|  |  |  | Golf ball No. | | | | | | |
|---|---|---|---|---|---|---|---|---|---|
|  |  |  | 1 | 2 | 3 | 4 | 5 | 6 | 7 |
| Core rubber composition | Formulation (parts by mass) | Polybutadiene rubber | 100 | 100 | 100 | 100 | 100 | 100 | 100 |
|  |  | ZN-DA90S | 30 | 28.5 | 25 | 20 | 15 | — | 32 |
|  |  | Zinc salt of 4-(6-methyl-1,2,4,5-tetrazine-3-yl)benzoic acid | — | 6 | 19 | 37 | 56 | 111 | — |
|  |  | Zinc oxide | 5 | 5 | 5 | 5 | 5 | 5 | 5 |
|  |  | Barium sulfate | *1) | *1) | *1) | *1) | *1) | *1) | *1) |
|  |  | PBDS | 0.3 | 0.3 | 0.3 | 0.3 | 0.3 | 0.3 | 0.3 |
|  |  | Dicumyl peroxide | 0.8 | 0.8 | 0.8 | 0.8 | 0.8 | 0.8 | 0.8 |
|  |  | Molar ratio ((b2)/(b1)) | — | 10.2 | 2.8 | 1.2 | 0.6 | 0 | — |
| Core | Molding conditions | Molding temperature (° C.) | 170 | 170 | 170 | 170 | 170 | 170 | 170 |
|  |  | Molding time (minute) | 20 | 20 | 20 | 20 | 20 | 20 | 20 |
|  | Properties | Compression deformation amount (mm) | 3.3 | 3.3 | 3.3 | 3.3 | 3.3 | 3.3 | 3 |
|  |  | Coefficient of restitution | 0.000 | 0.005 | 0.006 | 0.006 | 0.007 | 0.007 | 0.004 |
| Ball evaluation |  | Compression deformation amount (mm) | 3.0 | 3.0 | 3.0 | 3.0 | 3.0 | 3.0 | 2.7 |
|  |  | Flight distance (yd) | 0 | 0.7 | 0.8 | 0.8 | 1.0 | 1.0 | 0.6 |
|  |  | Shot feeling | G | G | G | G | G | G | F |

*1) Appropriate amount

The materials used in Table 1 are shown as follows.

Polybutadiene rubber: "BR730" (high-cis polybutadiene rubber (amount of cis-1,4 bond=96 mass %, amount of 1,2-vinyl bond=1.3 mass %, Moony viscosity (ML$_{1+4}$ (100° C.)=55, molecular weight distribution (Mw/Mn)=3)) available from JSR Corporation ZN-DA90S: zinc acrylate (containing zinc stearate in an amount of 10 mass %) available from Nisshoku Techno Fine Chemical Co., Ltd.

Zinc oxide: "Ginrei R" available from Toho Zinc Co., Ltd.

Barium sulfate: "Barium Sulfate BD" available from Sakai Chemical Industry Co., Ltd.

PBDS: bis(pentabromophenyl) disulfide available from Kawaguchi Chemical Industry Co., Ltd.

Dicumyl peroxide: "Percumyl (register trademark) D" available from NOF Corporation (2) Molding of Cover The materials having the formulation shown in Table 2 were mixed with a twin-screw kneading extruder to obtain the cover composition in a pellet form. The extruding conditions were a screw diameter of 45 mm, a screw rotational speed of 200 rpm, and screw L/D=35, and the mixtures were heated to 160° C. to 230° C. at the die position of the extruder.

TABLE 2

| Cover resin composition | | |
|---|---|---|
| Formulation (parts by mass) | Himilan 1605 | 50 |
|  | Himilan 1706 | 50 |
|  | Titanium oxide | 4 |
| Slab hardness (Shore D) |  | 65 |

The materials used in Table 2 are shown as follows.

Himilan (registered trademark) 1605: sodium ion neutralized ethylene-methacrylic acid copolymer ionomer resin available from Du Pont-Mitsui Polychemicals Co., Ltd.

Himilan 1706: zinc ion neutralized ethylene-methacrylic acid copolymer ionomer resin available from Du Pont-Mitsui Polychemicals Co., Ltd.

Titanium oxide: A220 available from Ishihara Sangyo Kaisha, Ltd.

The cover composition obtained above was injection molded onto the spherical core obtained above to form the cover covering the spherical core. The upper and lower molds for molding the cover have a semispherical cavity, and a pimple wherein a part of the pimple also serves as a retractable hold pin. When molding the cover, the hold pin was protruded to hold the core, the resin heated to 210° C. to 260° C. was charged for 0.3 sec into the mold held under a pressure of 80 ton, and cooled for 30 sec, and the mold was open to eject the golf ball.

The surface of the obtained golf ball bodies was subjected to a sandblast treatment, and a mark was formed thereon. Then, a clear paint was applied to the golf ball bodies, and the paint was dried in an oven of 40° C. to obtain golf balls having a diameter of 42.8 mm and a mass of 45.4. The evaluation results of the obtained golf balls are shown in Table 1.

The golf ball No. 1 is the case that the spherical core thereof is formed from a rubber composition only containing zinc acrylate as the co-crosslinking agent. The golf balls No. 2 to 6 are the cases that the spherical core thereof is formed from a rubber composition containing (b1) the carboxylic acid represented by the structural formula (1) and/or the metal salt as (b) the co-crosslinking agent. These golf balls No. 2 to 6 have greater coefficient of restitution than the golf ball No. 1, and are also excellent in the shot feeling. The golf ball No. 7 is the case that the amount of zinc acrylate blended in the rubber composition is increased. The golf ball No. 7 has increased coefficient of restitution, however, its shot feeling is lowered.

This application is based on Japanese patent application No. 2018-121541 filed on Jun. 27, 2018, the content of which is hereby incorporated by reference.

The invention claimed is:

1. A golf ball comprising a spherical core and at least one cover covering the spherical core, wherein the spherical core is formed from a rubber composition containing (a) a base rubber, and (b) a co-crosslinking agent containing (b1) a carboxylic acid and/or a metal salt thereof, wherein (b1) the carboxylic acid and/or the metal salt thereof is at least one member selected from the group consisting of carboxylic acids represented by structural formulae (3-3) to (3-11) and/or metal salts thereof,

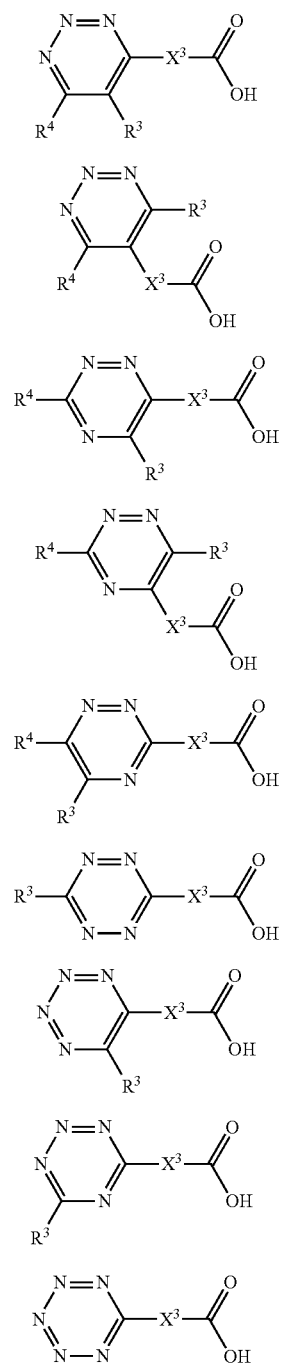

wherein
in the formulae (3-3) to (3-11), $X^3$ represents a single bond or a divalent hydrocarbon group having 1 to 20 carbon atoms;
in the formulae (3-3) to (3-7), $R^3$ or $R^4$ represent a hydrogen atom or a monovalent hydrocarbon group having 1 to 20 carbon atoms and at least one of $R^3$ or $R^4$ is the monovalent hydrocarbon group having 1 to 20 carbon atoms; and
in the formulae (3-8) to (3-10), $R^3$ represent a monovalent hydrocarbon group having 1 to 20 carbon atoms.

2. The golf ball according to claim 1, wherein the rubber composition contains (b1) the carboxylic acid and/or the metal salt thereof in an amount of from 5 parts by mass to 200 parts by mass with respect to 100 parts by mass of (a) the base rubber.

3. The golf ball according to claim 1, wherein (b) the co-crosslinking agent further contains (b2) an α,β-unsaturated carboxylic acid having 3 to 8 carbon atoms and/or a metal salt thereof, and a molar ratio ((b2)/(b1)) of a mole number of the unsaturated carboxylic acid component of (b2) to a mole number of the carboxylic acid component of (b1) is more than 0 and 15 or less.

4. The golf ball according to claim 1, wherein a metal ion of (b1) the metal salt of the carboxylic acid is a divalent metal ion.

5. The golf ball according to claim 4, wherein the metal ion is at least one member selected from the group consisting of beryllium ion, magnesium ion, calcium ion, zinc ion and barium ion.

6. The golf ball according to claim 1, wherein the divalent hydrocarbon group represented by $X^3$ is an alkylene group, a cycloalkylene group, an alkenylene group, or an arylene group.

7. The golf ball according to claim 1, wherein the monovalent hydrocarbon group represented by $R^3$ or $R^4$ is an alkyl group, a cycloalkyl group, an alkenyl group, an aryl group, an alkylaryl group, or an aralkyl group.

8. The golf ball according to claim 1, wherein (b1) the carboxylic acid and/or the metal salt thereof is at least one member selected from the group consisting of compounds represented by structural formulae (4-1) to (4-3) and/or metal salts thereof

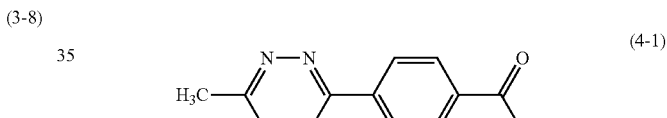

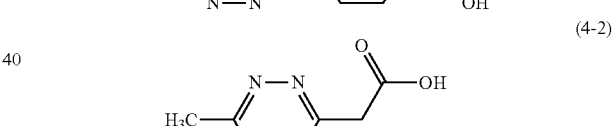

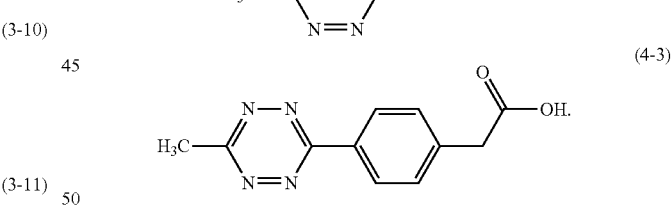

9. The golf ball according to claim 1, wherein an amount of (b1) the carboxylic acid and/or the metal salt thereof in (b) the co-crosslinking agent is from 14 mass % to 100 mass %.

10. The golf ball according to claim 1, wherein an amount of (b) the co-crosslinking agent in the rubber composition is from 10 parts by mass to 50 parts by mass or less with respect to 100 parts by mass of (a) the base rubber.

11. The golf ball according to claim 1, wherein the rubber composition further contains at least one member selected from the group consisting of (c) a crosslinking initiator, (d) a metal compound, and (e) an organic sulfur compound.

12. A golf ball comprising a spherical core and at least one cover covering the spherical core, wherein the spherical core is formed from a rubber composition containing (a) a base rubber, and (b) a co-crosslinking agent containing (b1) a carboxylic acid and/or a metal salt thereof, wherein (b1) the carboxylic acid and/or the metal salt thereof is at least one member selected from the group consisting of carboxylic acids represented by structural formulae (3-1) to (3-11) and/or metal salts thereof,

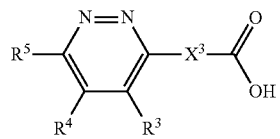
(3-1)

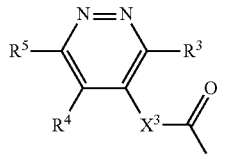
(3-2)

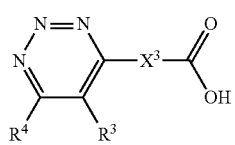
(3-3)

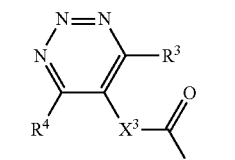
(3-4)

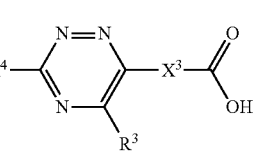
(3-5)

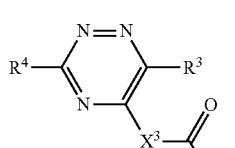
(3-6)

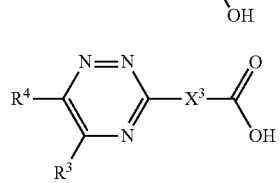
(3-7)

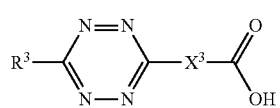
(3-8)

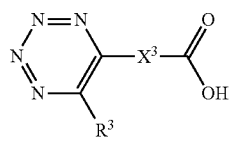
(3-9)

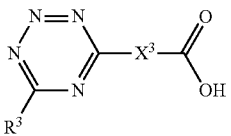
(3-10)

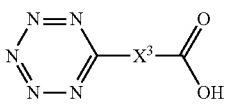
(3-11)

wherein in the formulae (3-1) to (3-11), $X^3$ represents a cycloalkylene group, an alkenylene group, or an arylene group; and $R^3$ to $R^5$ represent a hydrogen atom or a monovalent hydrocarbon group having 1 to 20 carbon atoms.

13. The golf ball according to claim 12, wherein the rubber composition contains (b1) the carboxylic acid and/or the metal salt thereof in an amount of from 5 parts by mass to 200 parts by mass with respect to 100 parts by mass of (a) the base rubber.

14. The golf ball according to claim 12, wherein (b) the co-crosslinking agent further contains (b2) an α,β-unsaturated carboxylic acid having 3 to 8 carbon atoms and/or a metal salt thereof, and a molar ratio ((b2)/(b1)) of a mole number of the unsaturated carboxylic acid component of (b2) to a mole number of the carboxylic acid component of (b1) is more than 0 and 15 or less.

15. The golf ball according to claim 12, wherein a metal ion constituting (b1) the metal salt of the carboxylic acid is a divalent metal ion.

16. The golf ball according to claim 15, wherein the metal ion is at least one member selected from the group consisting of beryllium ion, magnesium ion, calcium ion, zinc ion and barium ion.

17. The golf ball according to claim 12, wherein the monovalent hydrocarbon group represented by $R^3$ to $R^5$ is an alkyl group, a cycloalkyl group, an alkenyl group, an aryl group, an alkylaryl group, or an aralkyl group.

18. The golf ball according to claim 12, wherein an amount of (b1) the carboxylic acid and/or the metal salt thereof in (b) the co-crosslinking agent is from 14 mass % to 100 mass %.

19. The golf ball according to claim 12, wherein an amount of (b) the co-crosslinking agent in the rubber composition is from 10 parts by mass to 50 parts by mass or less with respect to 100 parts by mass of (a) the base rubber.

20. The golf ball according to claim 12, wherein the rubber composition further contains at least one member selected from the group consisting of (c) a crosslinking initiator, (d) a metal compound, and (e) an organic sulfur compound.

* * * * *